J. NORTON.
DETACHABLE HANDLE FOR TRUCKS.
APPLICATION FILED OCT. 22, 1915.
1,213,938.
Patented Jan. 30, 1917.
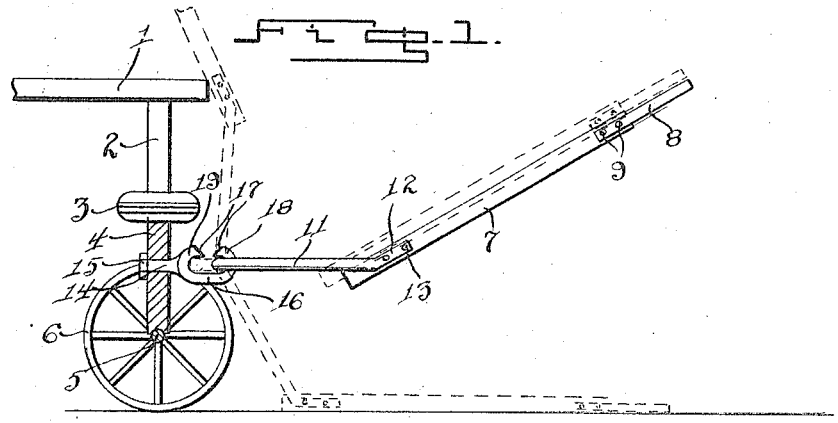
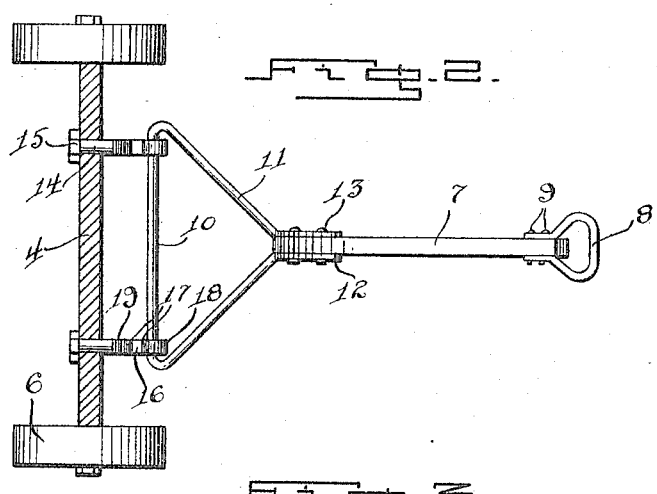
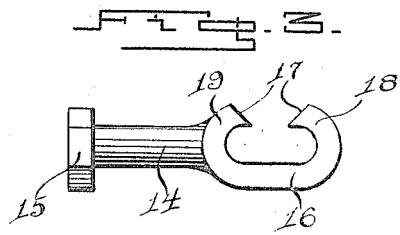
INVENTOR
James Norton,
WITNESSES
Francis Ph. O'Reilly
Wm. Webster Downing
BY Richard B. Owen
ATTORNEY

UNITED STATES PATENT OFFICE.

JAMES NORTON, OF REEDS FERRY, NEW HAMPSHIRE.

DETACHABLE HANDLE FOR TRUCKS.

1,213,938.  Specification of Letters Patent.  Patented Jan. 30, 1917.

Application filed October 22, 1915. Serial No. 57,322.

*To all whom it may concern:*

Be it known that I, JAMES NORTON, a citizen of the United States, residing at Reeds Ferry, in the county of Hillsboro and State of New Hampshire, have invented certain new and useful Improvements in Detachable Handles for Trucks, of which the following is a specification.

My invention relates to trucks and more particularly to a detachable handle therefor.

The primary object of my invention resides in the provision of a handle arranged in removable engagement with the axle bolster of a truck, the handle being adapted for vertical swinging movement arranged so that it can be positioned above the body or platform of the truck and due to its inclination and weight, maintained in this position or else arranged to lie flat upon the surface of the ground, thereby preventing persons from stumbling over the handle when the truck is not in use.

Another object of my invention resides in the provision of a novel securing element for the handle, the element being rigidly associated with the axle bolster but constructed to permit of the removal of the handle when so desired.

A further object of my invention resides in the peculiar construction of handle that is removably associated with the securing element.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings: Figure 1 is a side elevational view of my invention associated with a truck partly in section; Fig. 2 is a top plan view of the same partly in section; and Fig. 3 is an enlarged side elevational view of the securing element.

Referring more particularly to the drawings in which similar reference numerals designate like or corresponding parts throughout the different views, I provide a truck in this instance including a platform 1 having a body bolster 2 depending therefrom, the latter being associated with a fifth wheel 3 which is in turn associated with an axle bolster 4. Associated with the lower edge of the axle bolster 4 is a front axle 5 on the respective ends of which are removably and rotatably secured front supporting wheels 6. It is to be understood that I am not to be limited to the specific type of truck described, the latter being shown merely for the purpose of clearly illustrating the advantages of my improved detachable handle which is associated therewith.

My improved handle in this instance consists essentially of an elongated body preferably of wood, to one end of which is secured a preferably U-shaped grip 8 formed of rod iron, the terminals being secured on the respective sides of the body through the medium of suitable fastening devices 9. Associated with the opposite end of the body is a triangular connecting element formed preferably from a single piece of rod metal including a base 10, and converging sides 11, formed by bending the terminals of the base. The terminals of the sides are bent in spaced parallel relation, with each other and flattened to provide securing portions 12, the latter also extended in a plane, at an angle to the plane of the sides and base and secured upon opposite sides of the inner end of the body through the medium of suitable fastening devices, preferably nut and bolt arrangements 13. When the handle is secured to the truck in a manner to be hereinafter described the angular disposition of the securing elements permits the body of the handle to lie flat upon the surface of the ground. For the purpose of removably associating the handle with the truck, in this instance, I have provided two novel securing elements, each comprising a shank which extends through the axle bolster and is rigidly maintained in removable engagement therewith through the medium of a nut or other suitable fastening device 15, the under surface of which bears against the rear face of the axle bolster as illustrated to advantage in Figs. 1 and 2 of the drawings. The opposite end of each shank which extends laterally and forwardly of the bolster is enlarged to provide an oval-shaped open loop 16. The upper side of each loop is open, this being accomplished by slitting the upper side at a point intermediate the ends, beveling the free edges and arranging them in divergent relation from the center as illustrated by the numeral 17. The distance between the inner edges of the slit or opening is slightly larger than the diameter of the base 10.

In use two of the securing elements are associated with the axle bolster in the manner described and the base of the triangular connecting element is arranged between the diverging sides and guided into loops. The length of the base is slightly longer than the distance between the two elements so that the base can be guided through the diverging sides into the center of the loop. It is to be observed that the outer upper ends of the loops serve as substantial hooks 18 for facilitating engagement with the base while the upper inner ends 19 constitute guards for facilitating the retention of the base when the truck is being pushed backwardly and prevent accidental displacement of the base.

The operation of my invention is as follows: In associating the handle with the truck the hand grip 8 and the body 7 are engaged to the base 10 arranged between the diverging sides of the slit and forward movement imparted to the hand grip and body 7 so that the base bears against the hooked ends 18 of the loop 16 simultaneously imparting a movement to the truck which allows it to be drawn forwardly over the surface. If it is desired to reverse movement of the truck, the body 7 is forced rearwardly causing the base to slide in the loops and engage the opposite end of the loops or guards 19. When the truck is at a standstill, the handle may be released and because of the peculiar opening and arrangement of the securing portions 12, the body will be allowed to rest in intimate contact with the surface of the ground or floor. Again the handle may be swung upwardly and because of the angular disposition of the body 7 with respect to the triangular connecting element and because of the weight of the body, it will be maintained in an upright position against the platform 1, this arrangement being illustrated by dotted lines in Fig. 1. In removing the handle the base is drawn between the slit or opening where it can be subsequently applied to the same or to another truck.

Although I have shown and described the preferred embodiment of my invention, I desire to be understood that I am not to be limited to the exact details shown, however, I desire that great stress be laid upon the arrangement and peculiar coöperation of the securing elements, and triangular connecting elements for accomplishing the purposes set forth.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. In combination with the axle bolster of a truck, open loop securing elements anchored on the bolster, and a handle removably associated with the securing elements.

2. The combination with the axle bolster of a truck, of securing elements associated therewith, open loops formed integrally with the outer ends of the securing elements, a handle including a body, and a connecting element, said connecting element being removably associated with said open loops.

3. The combination with the axle bolster of a truck, securing elements associated therewith, open loops on the outer end of the securing elements, the outer ends of the loops constituting hooks, the inner ends of the loops constituting guards for the hooks, and a handle including a body and a connecting element for removable association with the loops.

4. The combination with the axle bolster of a truck, securing elements associated therewith, each including an engaging shank and an open loop, the outer end of each loop adjacent the slit constituting a guard for the hook, a handle including a body, and a triangular loop extending at an angle therefrom and removably associated with the loops and being adapted for vertical swinging movement to allow the body to lie flat on the ground when not in use.

In testimony whereof I affix my signature in presence of two witnesses.

JAMES NORTON.

Witnesses:
 AUSLEM DESMARAIS,
 THOMAS F. MORAN.

Copies of this patent may be obtained for five cents each, by addressing the "Commissioner of Patents, Washington, D. C."